United States Patent [19]

Orsulak et al.

[11] Patent Number: 5,636,861
[45] Date of Patent: Jun. 10, 1997

[54] AIR BAG MODULE

[75] Inventors: Paul J. Orsulak, Sterling Heights; Drew G. Downing, Almont; Stephen A. Ridella, Royal Oak, all of Mich.

[73] Assignee: TRW Vehicle Safety Systems Inc., Lyndhurst, Ohio

[21] Appl. No.: 593,749

[22] Filed: Jan. 29, 1996

[51] Int. Cl.$^6$ ............................................. B60R 21/22
[52] U.S. Cl. ................... 280/730.1; 280/732; 280/743.1
[58] Field of Search ........................... 280/230.1, 731, 280/732, 743.1, 743.2

[56] References Cited

U.S. PATENT DOCUMENTS

| | | | |
|---|---|---|---|
| 4,169,613 | 10/1979 | Barnett | 280/732 |
| 5,022,675 | 6/1991 | Zelenak, Jr. et al. | 280/743.1 |
| 5,160,164 | 11/1992 | Fischer et al. | 280/743.2 |
| 5,172,933 | 12/1992 | Strasser | 280/740 |
| 5,178,407 | 1/1993 | Kelley | 280/728.1 |
| 5,290,061 | 3/1994 | Bollaert | 280/743.1 |
| 5,306,039 | 4/1994 | Nakayama | 280/728.2 |
| 5,308,113 | 5/1994 | Moriset | 280/743.1 |
| 5,382,048 | 1/1995 | Paxton et al. | 280/743.1 |

*Primary Examiner*—Kenneth R. Rice
*Attorney, Agent, or Firm*—Tarolli, Sundheim, Covell, Tummino & Szato

[57] ABSTRACT

An air bag module (10) includes an inflatable device or air bag (30) and a diverter flap (100) for controlling inflation of the air bag. The air bag (30) has a first section (50) which is engageable with a vehicle windshield (18) and a second section (80) for engagement by the vehicle occupant. When the air bag (30) is in the folded condition, the flap (100) extends across a passage (92) into the second section (80) of the air bag. The flap (100) initially blocks flow of inflation fluid into the passage (92) and diverts the inflation fluid into the folded first section (50) of the air bag (30). Inflation of the second section (80) of the air bag (30) is delayed until the first section (50) of the air bag is at least partially inflated.

16 Claims, 3 Drawing Sheets

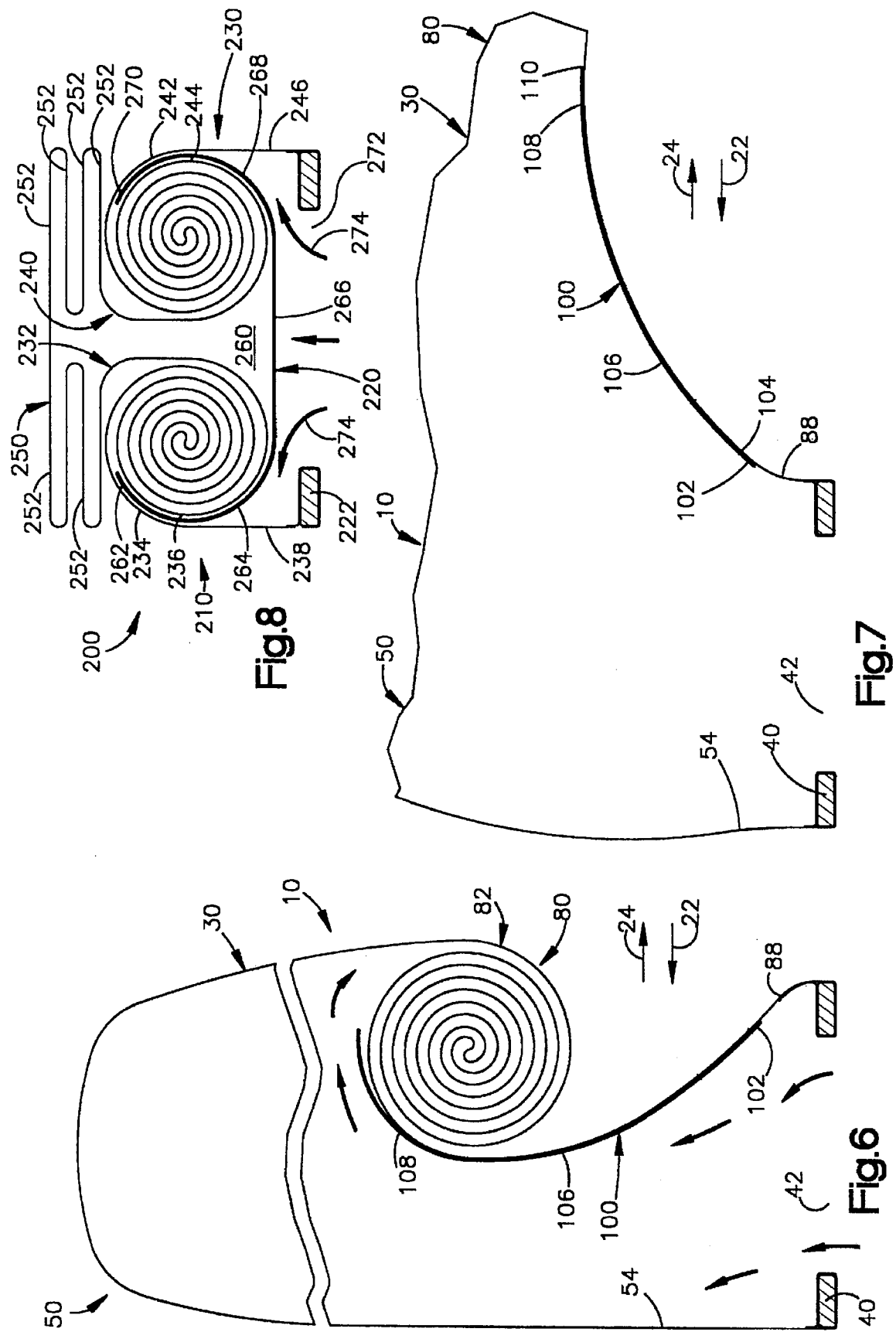

AIR BAG MODULE

BACKGROUND OF THE INVENTION

1. Technical Field

The present invention relates to a vehicle occupant safety apparatus including an inflatable vehicle occupant protection device, such as an air bag. In particular, the present invention relates to an air bag module including a sheet material element for directing inflation fluid into a folded air bag to cause a predetermined portion of the air bag to inflate first.

2. Description of the Prior Art

It is known to inflate an air bag to help protect an occupant of a vehicle in the event of sudden deceleration such as occurs in a vehicle collision. The air bag is stored in a deflated condition, together with an inflator, in a housing adjacent to the vehicle seat in which the occupant sits. The inflator, when actuated, provides a large volume of inflation fluid to inflate the air bag into a position to help protect the vehicle occupant.

An air bag for helping to protect an occupant of a front seat of a vehicle in the event of a frontal collision to the vehicle is typically stored in the vehicle instrument panel. The air bag inflates upward and rearward into a position between the vehicle occupant and the vehicle instrument panel to help protect the vehicle occupant. A portion of the inflating air bag may contact the vehicle windshield and transmit a large amount of force to the vehicle windshield. It is desirable to control inflation of the various portions of the air bag in order to inflate the air bag in a manner so that it does not damage the windshield.

SUMMARY OF THE INVENTION

The present invention is a vehicle safety apparatus comprising an inflatable vehicle occupant protection device having an inflated condition for helping to protect an occupant of a vehicle and a deflated, folded condition. The inflatable device is a first sheet material element which defines an inflation fluid volume and which contains inflation fluid when the inflatable device is in the inflated condition. The inflatable device, when in the folded condition, has a first section which is folded into a first group of first folded portions and a second section which is folded into a second group of second folded portions. The first and second groups define a passage through which inflation fluid flows into the second section of the inflatable device to inflate the second section. The vehicle safety apparatus further comprises means for blocking flow of inflation fluid into the second section of the inflatable device until the first section is at least partially inflated. The means for blocking comprises a second sheet material element which is folded with the inflatable device when the inflatable device is in the folded condition. The second sheet material element extends across the passage and blocks flow of inflation fluid into the passage when the inflatable device is in the folded condition. In one embodiment, the first section of the inflatable device is engageable with the vehicle windshield and the second section of the inflatable device is engageable by the vehicle occupant.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 6 is a view similar to FIG. 5 showing the air bag in a second partially inflated condition;

FIG. 7 is a fragmentary view of the air bag in a fully inflated condition; and

FIG. 8 is a view similar to FIG. 4 of portions of an air bag module constructed in accordance with a second embodiment of the present invention.

DESCRIPTION OF PREFERRED EMBODIMENTS

Figure 1:
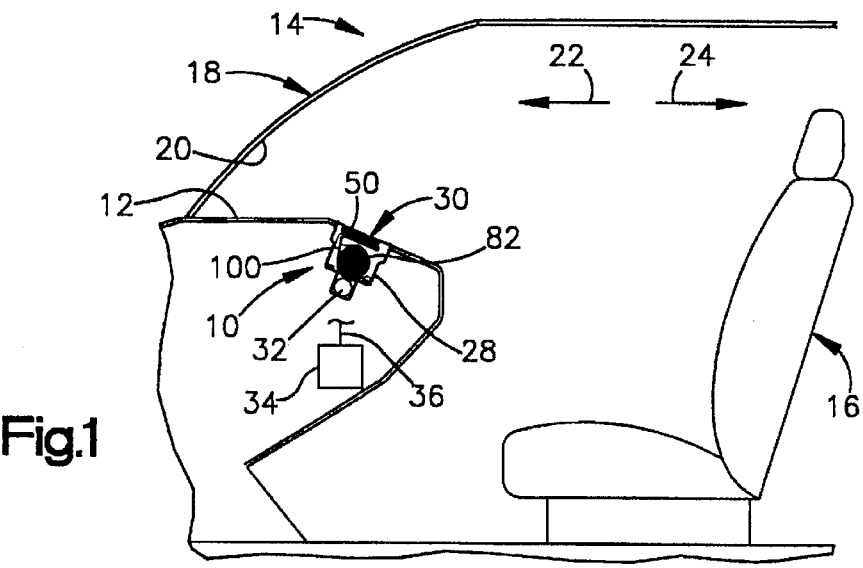
FIG. 1 is a schematic illustration of a portion of a vehicle including a vehicle seat and an instrument panel in which is mounted an air bag module constructed in accordance with a first embodiment of the present invention.

The present invention relates to a vehicle occupant safety apparatus including an inflatable vehicle occupant protection device, such as an air bag. In particular, the present invention relates to an air bag module including a sheet material element for directing inflation fluid into a folded air bag to cause a predetermined portion of the air bag to inflate first. As representative of the present invention, FIG. 1 illustrates a vehicle occupant safety apparatus or air bag module 10 which is constructed in accordance with a first embodiment of the present invention.

The air bag module 10 is mounted in an instrument panel 12 of a vehicle 14, adjacent to a vehicle seat 16. The instrument panel 12 is disposed adjacent to a windshield 18 of the vehicle. The windshield 18 has an inner side surface 20. A forward direction in the vehicle is indicated by the arrow 22 in FIG. 1, and a rearward direction in the vehicle is indicated by the arrow 24.

The safety apparatus 10 includes a housing 28 within which is disposed an inflatable occupant protection device 30 of the type commonly known as an air bag. The module 10 also includes an inflator 32. The inflator 32 comprises a source of inflation fluid for inflating the air bag 30. As known in the art, the inflator 32 may contain an ignitable gas-generating material which, when ignited, rapidly generates a large volume of gas. The inflator 32 may alternatively contain a stored quantity of pressurized inflation fluid, or a combination of pressurized inflation fluid and ignitable material for heating the inflation fluid.

The inflator 32 has a plurality of fluid outlet openings (not shown) through which inflation fluid is directed into the housing 28 upon actuation of the inflator. Although the housing 28 is shown as a separate structure which is mounted in the instrument panel 12, such a housing could alternatively be defined by the structure of the instrument panel, or by another part of the vehicle 14 from which the air bag 30 is to be inflated to help protect the occupant of the seat 16.

The vehicle safety apparatus 10 also includes vehicle electric circuitry indicated schematically at 34. The vehicle electric circuitry 34 includes a power source, which is preferably the vehicle battery and/or a capacitor, and a normally open switch. The switch is part of a sensor which senses a condition indicating the occurrence of a vehicle collision. The collision-indicating condition may comprise, for example, sudden vehicle deceleration caused by a collision. If the collision-indicating condition sensed by the sensor is above a predetermined threshold, it indicates the occurrence of a collision for which inflation of the air bag 30 is desired to help protect the occupant of the vehicle. The sensor then closes the switch, and an actuation signal is sent to the inflator 32 over lead wires 36. When the inflator 32 is actuated, it emits a large volume of inflation fluid into the housing 28. The housing 28 directs the inflation fluid from the inflator 32 into the air bag 30, to inflate the air bag in a manner described below.

The air bag 30 is a flexible sheet material element, which is made from a material such as woven nylon and which, when inflated, contains inflation fluid from the inflator 32. The air bag 30 (FIG. 4) is illustrated as being connected with a retainer 40 for securing the air bag in the housing 28. The air bag 30 has an inflation fluid opening 42 through which inflation fluid from the inflator 32 flows to inflate the air bag 30. The air bag 30 is shown schematically in FIG. 4 in a deflated, folded condition. It should be understood that the word "folded" as used herein can include "rolled", and the term "folding" can include "rolling", as indicated by the context.

The air bag 30 has a relatively small first section 50 and a relatively large second section 80. The first section 50 (FIG. 4) of the air bag 30 is folded into a group or stack 52 of first folded portions of the air bag. A portion 54 of the first section 50 of the air bag 30 extends between and interconnects the retainer 40 and the stack 52 of first folded portions of the air bag 30.

Figure 4:
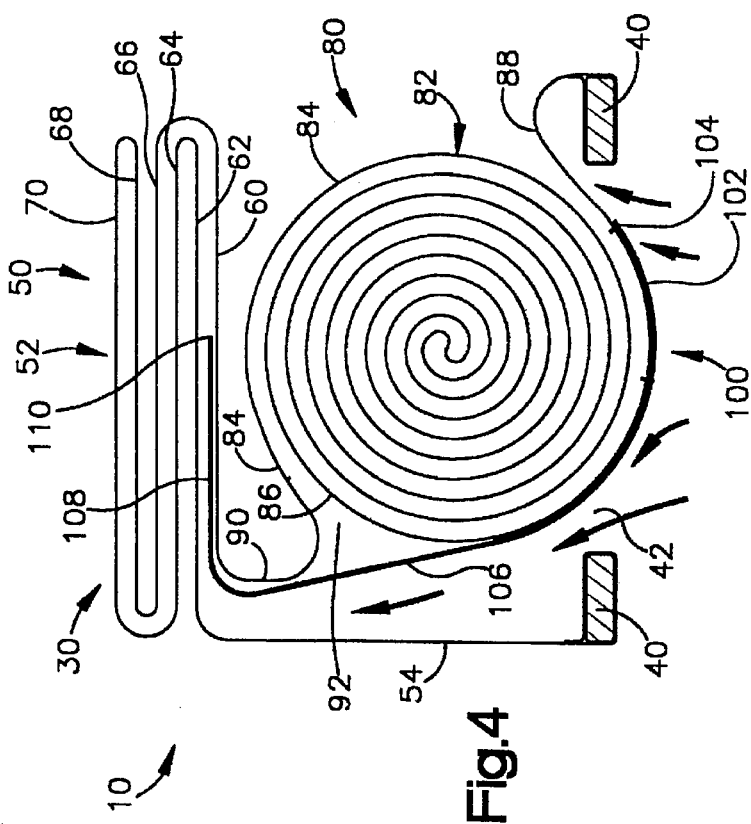
FIG. 4 is a schematic illustration of portions of the air bag module of FIG. 1 showing the air bag in a deflated, folded condition.

The stack 52 of first folded portions of the air bag 30 includes a first pair 60 and 62 of folded portions which are disposed adjacent to each other and closest to the retainer 40. The stack 52 also includes a second pair 64 and 66 of folded portions of the air bag 30 which are adjacent to each other and outside of (that is, above as viewed in FIG. 4) the first pair 60 and 62. A third pair 68 and 70 of folded portions of the air bag 30 are disposed adjacent to each other and farthest from the retainer, that is, on the outside of the stack 52. It should be understood that the illustration of the stack 52 in FIG. 4 is only schematic and that a larger or smaller number of folded portions of the air bag 30 may be included in the first section 50 of the air bag as folded.

The second section 80 of the air bag 30 includes a second group of portions of the air bag which are formed into a roll 82. One portion 84 of the second section 80 of the air bag 30 forms an outer layer or outer portion of the roll 82. A next innermost layer or portion 86 of the roll 82 is disposed adjacent to and underlies the outer layer 84. The layers or portions 84 and 86 of the air bag 30 define a passage 92 through which inflation fluid from the inflator 32 can flow to inflate the second section 80 of the air bag. A portion 88 of the second section 80 of the air bag 30 is secured to the retainer 40 and extends between and interconnects the retainer and the roll 82. A portion 90 of the folded air bag 30 extends between and interconnects the stack 52 and the roll 82.

The air bag module 10 includes a second sheet material element or diverter flap 100 which is folded with the air bag 30. The flap 100 is preferably is made from the same material as the air bag 30. The flap 100 is preferably impermeable to inflation fluid from the inflator 32 and, because of its position exposed directly to the output of the inflator, also is resistant to heat.

A first end portion 102 of the flap 100 is fixed to the material of the air bag 30. The first end portion 102 of the flap 100 is fixed to the air bag portion 88 which extends between the retainer 40 and the roll 82. The flap 100 is illustrated as being secured to the air bag 30 by a stitching line indicated schematically at 104, although other suitable means could be used. It should be understood that the first end portion 102 of the flap 100 could be secured to the air bag 30 at another location so long as the flap is extensible across the passage 92 as described below.

An intermediate portion 106 of the flap 100 is disposed between the portion 54 of the air bag 30 and the roll 82. The intermediate portion 106 of the flap 100 extends across the passage 92 and is disposed between the inflation fluid opening 42 and the passage. A second end portion or free end 108 of the flap 100 extends into the stack 52 of first folded portions of the air bag 30. The second end portion 108 of the flap 100 has a terminal end 110 disposed between the first pair 60 and 62 of first folded portions of the air bag 30.

When the air bag 30 is in the deflated, folded condition, the various layers of material of the air bag are, preferably, tightly packed together in a compact shape (the layers are, for clarity, shown spaced apart in FIGS. 4–8). The intermediate portion 106 of the flap 100 is diposed between and may, at least partially, be gripped between the roll 82 and the portions 54 and 90 of the air bag 30. The second end portion 108 of the flap 100 is gripped between the portions 60 and 62 of the first section 50 of the air bag tightly enough to resist movement of the second end portion 108 relative to the air bag. The second end portion 108 of the flap 100 is free of connection with the air bag 30, that is, it is not sewn or otherwise physically fixed to the air bag.

Upon actuation of the inflator 32 as described above, the housing 28 directs inflation fluid from the inflator into the inflation fluid opening 42. The inflation fluid from the inflator 32 contacts the air bag 30 and causes the air bag to begin to inflate. As the inflation fluid begins to inflate the air bag 30, the air bag moves from the deflated, folded condition shown in FIG. 4 to a first, partially inflated condition shown schematically in FIG. 5.

Figure 5:
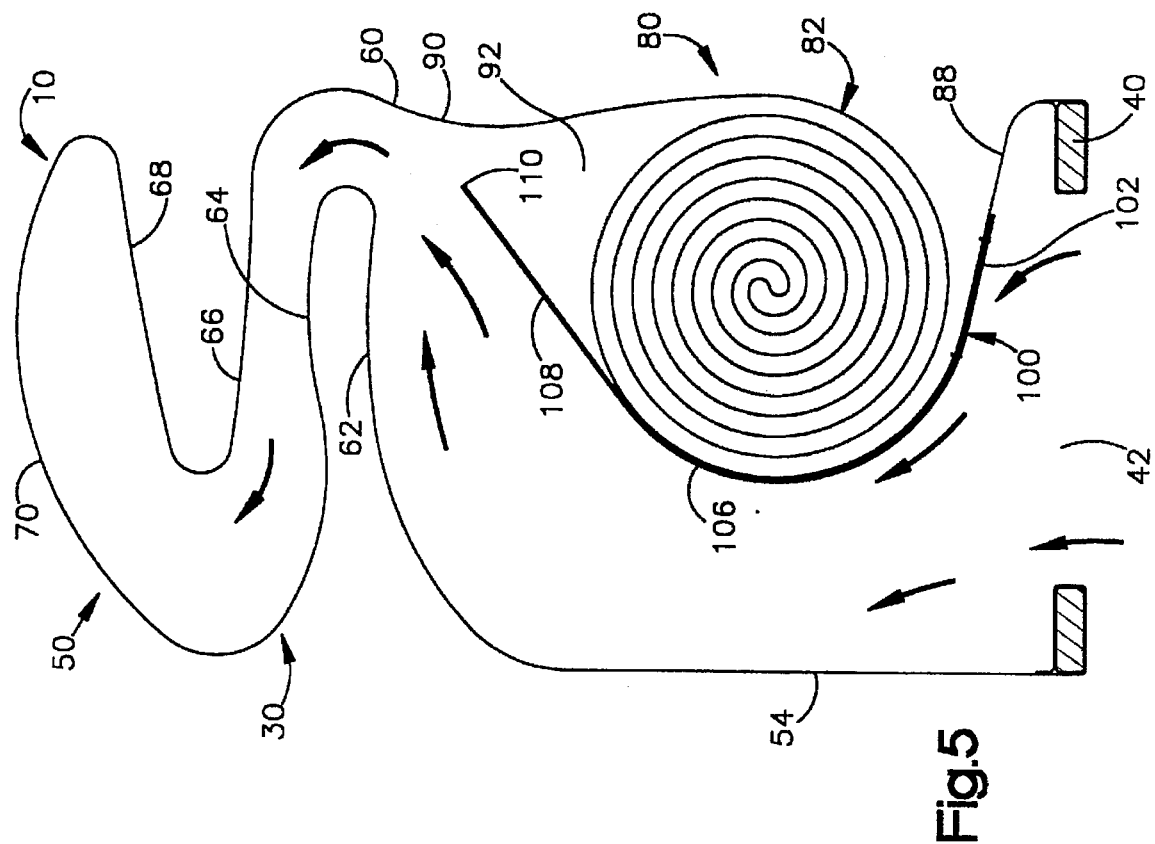
FIG. 5 is a view similar to FIG. 4 showing the air bag in a first partially inflated condition.

The inflation fluid from the inflator 32 flows between the flap 100 and the air bag portion 54 which interconnects the retainer 40 and the stack 52. The inflation fluid is directed by the flap 100 into the first section 50 of the air bag 30. The inflation fluid flows along and past the second end portion 108 of the flap 100 and into the inflation fluid volume formed by the folded portions 60–70 of the first section 50 of the air bag 30. The first section 50 of the air bag 30 begins to inflate as illustrated in FIG. 5.

During this initial stage of inflation of the air bag 30, the second section 80 of the air bag is temporarily blocked from inflation by the flap 100. Specifically, the intermediate portion 106 of the flap 100, which extends across the passage 92, blocks the flow of inflation fluid into the passage 92 and diverts the flow into the first section 50 of the air bag. As a result, unrolling of the roll 82 and inflation of the second section 80 of the air bag 30 are substantially delayed. Therefore, as illustrated schematically in FIGS. 5 and 6, the first section 50 of the air bag 30 inflates, at least partially, prior to any substantial inflation of the rolled first section 80 of the air bag 30.

Eventually, as the air bag 30 inflates more completely (FIG. 6), the flap 100 ceases to block the flow of inflation fluid into the roll 82. The second section 80 of the air bag 30 unrolls and inflates completely. The pressure of the inflation fluid within the air bag 30 (FIG. 7) forces the flap 100 outwardly to lie against the material of the air bag. The flap 100, in this condition, does not significantly impede the flow of inflation fluid into the air bag 30.

Figure 2:
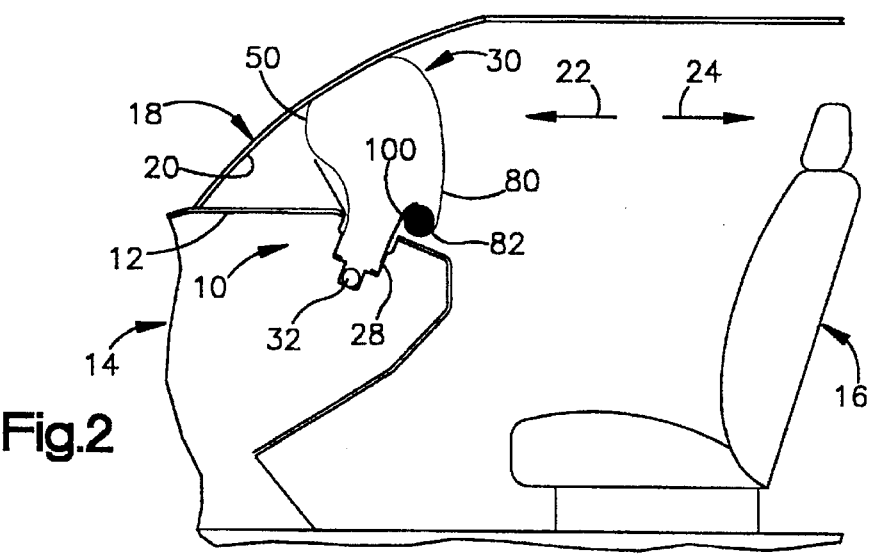
FIG. 2 is a view similar to FIG. 1 showing an air bag of the air bag module in a partially inflated condition.
Figure 3:
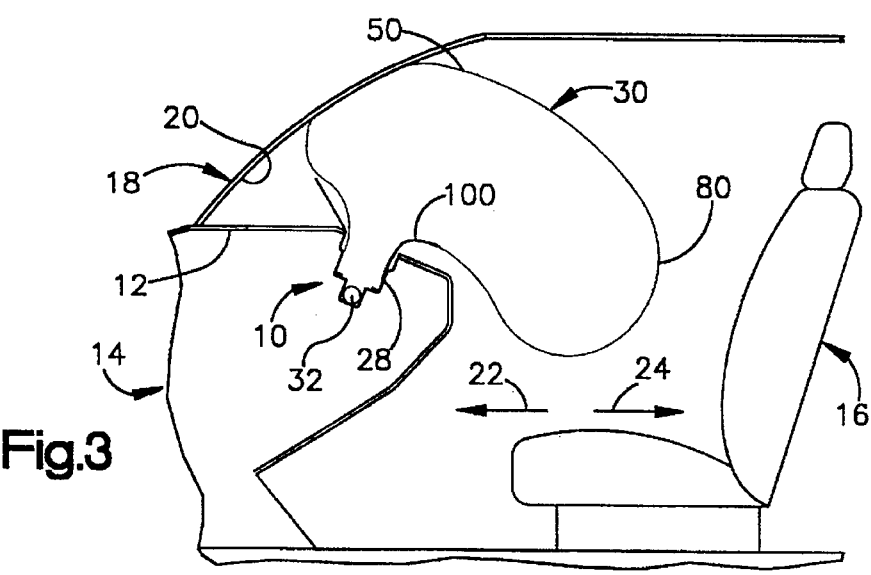
FIG. 3 is a view similar to FIG. 2 showing the air bag in a fully inflated condition.

The delayed inflation of the second section 80 of the air bag 30, during the initial stages of deployment of the air bag, is illustrated schematically in FIGS. 2 and 3. In FIG. 2, the relatively small first section 50 of the air bag 30 is illustrated as being at least partially inflated and in engagement with the inner side surface 20 of the windshield 18 of the vehicle 14. The relatively large second section 80 of the air bag 30 is inflated only by a small amount. The force of the inflation fluid does not propel the relatively large, tightly rolled second section 80 of the air bag 30 against the windshield 18. Instead, the force of the inflating air bag 30 is spread out over a substantial portion of the surface area of the windshield 18, by the initial contact of the inflated first section 50 of the air bag. The second section 80 of the air bag 30 subsequently inflates rearwardly, in a direction away from the windshield 18 as illustrated schematically in FIG. 3, and is engaged by the vehicle occupant.

FIG. 8 illustrates schematically portions of an air bag module 200 which is constructed in accordance with a second embodiment of the present invention. The module 200 includes a housing and an air bag inflator (both not shown) which may be the same as or similar to the housing 28 and the inflator 32 (FIGS. 1–7). The module 200 also includes an air bag 210, a diverter flap 220 for controlling inflation of the air bag, and a retainer 222 for connecting the air bag with the housing of the module 200.

The air bag 210 may be made from the same material as the air bag 30 (FIGS. 1–7). The air bag 210 includes a first section 230 which is rolled into two rolls 232 and 240. The first roll 232 includes two outermost layers 234 and 236. A portion 238 of the first section 230 of the air bag 210 extends between and interconnects the first roll 232 and the retainer 222. The second roll 240 includes two outermost layers or portions 242 and 244. A portion 246 of the second section 230 of the air bag 210 extends between and interconnects the second roll 240 and the retainer 222.

A second section 250 of the air bag 210 is folded into a group or stack of folded portions 252. The first roll 232 and the second roll 240 define between them a passage 260 into the second section 250 of the air bag 210. Inflation fluid from the inflator (not shown) can flow through the passage 260 to inflate the second section 250 of the air bag 210.

The diverter flap 220 is a sheet material element which can be made from the same material as the flap 100 (FIGS. 1–7). A first end portion 262 of the flap 220 is gripped between the layers 234 and 236 of the first roll 232. The first end portion 262 of the flap 220 is thus blocked from movement relative to the first roll 232 when the air bag 210 is in the folded condition illustrated in FIG. 8. The first end portion 262 of the flap 220 is free of connection with the air bag 210, that is, it is not sewn or otherwise physically fixed to the air bag.

A portion 264 of the flap 220 extends around the roll 232 between the first end portion 262 and an intermediate portion 266 of the flap. The intermediate portion 266 of the flap extends across the passage 260 between the rolls 232 and 240. Another portion 268 of the flap 220 extends around the second roll 240.

A second end portion 270 of the flap 220 is gripped between the layers 242 and 244 of the second roll 240. The second end portion 270 of the flap 220 is thus blocked from movement relative to the second roll 240 when the air bag 210 is in the folded condition shown in FIG. 8. The second end portion 270 of the flap 220 is free of connection with the air bag 210, that is, it is not sewn or otherwise physically fixed to the air bag.

Upon actuation of the inflator of the air bag module 200, inflation fluid flows through an inflation fluid opening 272 in the air bag 210. The inflation fluid contacts the intermediate portion 266 of the flap 220. The intermediate portion 266 of the flap 220 temporarily blocks the flow of inflation fluid into the passage 260. The inflation fluid from the inflator is diverted to flow in two directions as indicated by the arrows 274. A first portion of the inflation fluid flows around the first roll 232 between the air bag portion 238 and the portions 264 and 262 of the flap 220. A second portion of the inflation fluid flows around the second roll 240, between the portion 246 of the air bag and the portions 268 and 270 of the flap 220.

The inflation fluid causes the first and second rolls 232 and 240 to inflate first. The second section 250 of the air bag 210 is temporarily delayed from inflation because the flap 220 blocks the flow of inflation fluid into the passage 260. After a short period of time, the first section 230 of the air bag 210 is inflated sufficiently so that the flap 220 no longer blocks the flow of inflation fluid into the second section 250 of the air bag. The second section 250 of the air bag then inflates, along with the first section 230 of the air bag.

From the above description of the invention, those skilled in the art will perceive improvements, changes and modifications in the invention. Such improvements, changes and modifications within the skill of the art are intended to be covered by the appended claims.

Having described the invention, we claim the following:

1. A vehicle safety apparatus comprising:

an inflatable vehicle occupant protection device having an inflated condition for helping to protect an occupant of a vehicle and a deflated, folded condition;

said inflatable device comprising a first sheet material element which defines an inflation fluid volume and which contains inflation fluid when said inflatable device is in the inflated condition;

said inflatable device, when in the folded condition, having a first section which is folded into a first group of first folded portions and a second section which is folded into a second group of second folded portions, said inflatable device having a passage through which inflation fluid flows into said second section of said inflatable device to inflate said second section;

said vehicle safety apparatus further comprising means for blocking inflation of said second section of said inflatable device until said first section of said inflatable device is at least partially inflated, said means for blocking comprising a second sheet material element which is folded with said inflatable device when said inflatable device is in the folded condition, said second sheet material element extending across said passage and blocking flow of inflation fluid into said passage when said inflatable device is in the folded condition.

2. An apparatus as set forth in claim 1 wherein said first section of said inflatable device forms a forward section of said inflatable device which is engageable with a windshield of the vehicle when said inflatable device is in the inflated condition, said second section of said first sheet material element forming a rear section of said inflatable device which is engageable by the vehicle occupant when said inflatable device is in the inflated condition.

3. An apparatus as set forth in claim 2 wherein said second section of said inflatable device is substantially in the folded condition upon engagement of said first section of said inflatable device with the windshield of the vehicle.

4. An apparatus as set forth in claim 1 wherein one of said first and second groups of folded portions of said inflatable device comprises a roll having adjacent first and second layers, said passage extending between said first and second layers of said roll.

5. An apparatus as set forth in claim 4 wherein said inflatable device has an inflation fluid opening, said roll being disposed intermediate said inflation fluid opening and the other one of said first and second groups of folded portions of said inflatable device.

6. An apparatus as set forth in claim 1 wherein said second sheet material element lies flat against an inner side surface of said inflatable device when said inflatable device is in the inflated condition.

7. An apparatus as set forth in claim 1 wherein said second sheet material element has first and second opposite end portions and an intermediate portion, said first end portion being fixed to said inflatable device, said intermediate portion extending across said passage, said second end portion being free of connection with said inflatable device.

8. An apparatus as set forth in claim 7 wherein said first end portion of said second sheet material element is sewn to said inflatable device.

9. An apparatus as set forth in claim 1 wherein said second sheet material element has first and second opposite end portions and an intermediate portion, said first end portion being gripped between adjacent folded portions of said inflatable device, said intermediate portion extending across said passage, said second end portion being gripped between adjacent folded portions of said inflatable device.

10. A vehicle safety apparatus for mounting in an instrument panel of a vehicle to help protect an occupant of a front seat of a vehicle, said apparatus comprising:

an inflatable vehicle occupant protection device having an inflated condition for helping to protect the occupant and a deflated, folded condition;

said inflatable device comprising a first sheet material element which defines an inflation fluid volume and which contains inflation fluid when said inflatable device is in the inflated condition;

said inflatable device when in the inflated condition having a forward section which is engageable with a windshield of the vehicle and a rear section for engagement by the vehicle occupant;

said forward section of said inflatable device being folded into a stack and said rear section of said inflatable device being rolled into a roll disposed adjacent to said stack when said inflatable device is in the folded condition;

said stack and said roll defining a passage through which inflation fluid flows into said roll to inflate said rear section of said inflatable device;

said vehicle safety apparatus further comprising a second sheet material element which is folded with said inflatable device when said inflatable device is in the folded condition, said second sheet material element extending across said passage and blocking flow of inflation fluid into said roll when said inflatable device is in the folded condition thereby to block inflation of said rear section of said inflatable device until said forward section of said inflatable device is at least partially inflated.

11. A vehicle safety apparatus as set forth in claim 10 wherein said second sheet material element comprises a flap having a first end portion, an intermediate portion, and a second end portion;

said apparatus comprising means for blocking movement of said first end portion of said flap relative to said first sheet material element;

said intermediate portion of said flap extending across said passage and blocking flow of inflation fluid into said passage when said inflatable device is in the folded condition;

said second end portion of said flap being free of connection with said first sheet material element.

12. An apparatus as set forth in claim 11 wherein said means for blocking movement of said first end portion of said flap comprises at least one stitching line joining said first end portion of said flap to said inflatable device.

13. An apparatus as set forth in claim 11 wherein said means for blocking movement of said first end portion of said flap comprises adjacent folded portions of said inflatable device which grip said first end portion of said flap.

14. An apparatus as set forth in claim 10 wherein second section of said inflatable device is substantially in the folded condition upon engagement of said first section of said inflatable device with the windshield of the vehicle.

15. An apparatus as set forth in claim 10 wherein said inflatable device has an inflation fluid opening, said roll being disposed intermediate said inflation fluid opening and said stack.

16. An apparatus as set forth in claim 10 wherein said second sheet material element lies flat against an inner side surface of said inflatable device when said inflatable device is in the inflated condition.

\* \* \* \* \*